US010579655B2

(12) United States Patent
Bao et al.

(10) Patent No.: US 10,579,655 B2
(45) Date of Patent: Mar. 3, 2020

(54) METHOD AND APPARATUS FOR COMPRESSING TOPIC MODEL

(71) Applicant: Baidu International Technology (Shenzhen) Co., Ltd., Shenzhen, Guangdong Province (CN)

(72) Inventors: Siqi Bao, Shenzhen (CN); Zeyu Chen, Shenzhen (CN); Di Jiang, Shenzhen (CN); Jingzhou He, Shenzhen (CN)

(73) Assignee: Baidu International Technology (Shenzhen) Co., Ltd., Shenzhen, Guangdong Province (CN)

( * ) Notice: Subject to any disclaimer, the term of this patent is extended or adjusted under 35 U.S.C. 154(b) by 132 days.

(21) Appl. No.: 15/891,289

(22) Filed: Feb. 7, 2018

(65) Prior Publication Data

US 2018/0329985 A1 Nov. 15, 2018

(30) Foreign Application Priority Data

May 11, 2017 (CN) .......................... 2017 1 0331369

(51) Int. Cl.
*G06F 16/00* (2019.01)
*G06F 16/33* (2019.01)
(Continued)

(52) U.S. Cl.
CPC ........ *G06F 16/3334* (2019.01); *G06F 16/313* (2019.01); *G06F 17/18* (2013.01);
(Continued)

(58) Field of Classification Search
CPC ...... G06F 17/21; G06F 17/2785; G06F 17/18; G06F 16/313
See application file for complete search history.

(56) References Cited

U.S. PATENT DOCUMENTS

| 4,955,066 A * | 9/1990 | Notenboom ............ G06T 9/005 358/1.9 |
| 10,242,019 B1 * | 3/2019 | Shan ...................... G06F 16/285 |
| 2017/0132314 A1 * | 5/2017 | Liu ...................... G06F 17/2785 |

FOREIGN PATENT DOCUMENTS

| CN | 105183813 | 12/2015 |
| CN | 105571005 A | 5/2016 |

OTHER PUBLICATIONS

Jurgen Abel and William Teahan, "Universal Text Preprocessing Data Compression", IEEE Transactions on Computers, vol. 54, No. 5, May 2005, pp. 497-507. (Year: 2005).*

* cited by examiner

*Primary Examiner* — Cheryl Lewis
(74) *Attorney, Agent, or Firm* — Marshall, Gerstein & Borun LLP (57) ABSTRACT

A method comprises: acquiring a to-be-compressed topic model, wherein each line of the topic model represents a distribution of a word among respective topics; performing a format conversion on the topic model to obtain a first topic model, wherein each line of the first topic model represents a distribution of a topic among respective words; selecting any two topics from the first topic model to form a topic pair, forming a topic pair set using at least one topic pair, and determining a similarity between the two topics in each topic pair in the topic pair set; merging topic pairs having a similarity greater than a similarity threshold to generate a second topic model; and performing a format conversion on the second topic model to obtain a compressed topic model, so that each line of the compressed topic model represents a distribution of a word among the respective topics.

11 Claims, 6 Drawing Sheets

(51) Int. Cl.
*G06F 17/18* (2006.01)
*G06F 16/31* (2019.01)
*G06N 20/00* (2019.01)
*G06N 5/00* (2006.01)
*G06F 40/10* (2020.01)
*G06F 40/20* (2020.01)
*G06F 40/30* (2020.01)
*G06N 7/00* (2006.01)

(52) U.S. Cl.
CPC .............. *G06F 40/10* (2020.01); *G06F 40/20* (2020.01); *G06F 40/30* (2020.01); *G06N 5/00* (2013.01); *G06N 20/00* (2019.01); *G06N 7/005* (2013.01)

METHOD AND APPARATUS FOR COMPRESSING TOPIC MODEL

CROSS-REFERENCE TO RELATED APPLICATION

This application claims the priority of Chinese Patent Application No. 201710331369.4, entitled "Method And Apparatus For Compressing Topic Model," filed on May 11, 2017, the content of which is incorporated herein by reference in its entirety.

TECHNICAL FIELD

The present disclosure relates to the field of computer technology, in particular to the technical field of artificial intelligence, and more particularly, to a method and apparatus for compressing a topic model.

BACKGROUND

Artificial Intelligence, abbreviated as AI, is a new technological science that studies and develops theories, methods, techniques and application systems for simulating, extending, and expanding human intelligence. AI, as a branch of the computer science, attempts to understand the essence of intelligence and produce a new type of intelligent machine that can make a response in a manner similar to human intelligence. Research in the field includes robots, speech recognition, image recognition, natural language processing, expert systems, etc.

Topic modeling, being a common machine learning application, is primarily used for categorizing texts. Important topic models including Latent Dirichlet Allocation (LDA) model and probabilistic Latent Semantic Analysis (pLSA) model are widely applied to text search, advertisement recommendation and other fields. With the popularization of the Internet, the training data of the topic modeling has also been migrated from the small-scale document collection to the large-scale online corpus. As a result, the training data becomes more complicated, and the number of words in the vocabulary is dramatically increased, thereby resulting in the need for a larger volume of topic models and setting up more latent topics to grasp long-tailed semantic information. However, as the number of topics increases, there are also some problems: 1. Considerable repetition exists between different topics, the redundancy worsens the interpretability of a single topic and lowers the efficiency of the entire model; 2. excessive trained model parameters, which not only bring about storage difficulty, but also overburden the subsequent calculation of the topic model.

SUMMARY

An object of the present disclosure is to provide an improved method and apparatus for compressing a topic model for solving the technical problems mentioned in the above-mentioned background technology section.

In a first aspect, an embodiment of the present disclosure provides a method for compressing a topic model. The method comprises: acquiring a to-be-compressed topic model, wherein each line of the topic model represents a distribution of a word among respective topics; performing a format conversion on the topic model to obtain a first topic model, wherein each line of the first topic model represents a distribution of a topic among respective words, and the respective words on the topic are sorted in a descending order according to a number of the words on the topic; selecting any two topics from the first topic model to form a topic pair, forming a topic pair set using at least one topic pair, and determining a similarity between the two topics in each topic pair in the topic pair set; merging the topic pairs having similarity greater than a similarity threshold to generate a second topic model; and performing a format conversion on the second topic model to obtain a compressed topic model, wherein each line of the compressed topic model represents a distribution of a word among the respective topics.

In some embodiments, the determining a similarity between the two topics in each topic pair in the topic pair set comprises: determining a Jaccard similarity between words in the two topics of the each topic pair in the topic pair set.

In some embodiments, the determining a similarity between the two topics in each topic pair in the topic pair set comprises: determining a similarity according to a repetition probability of words in the two topics of the each topic pair in the topic pair set.

In some embodiments, the merging topic pairs having a similarity greater than a similarity threshold to generate a second topic model comprises: determining a disjoint topic set using a union-find algorithm; and merging topics in the disjoint topic set to generate a second topic model.

In some embodiments, before the performing a format conversion on the second topic model to obtain a compressed topic model, the method further comprises: for each topic in the second topic model, determining a probability distribution of each word among the topic; and deleting a word having the probability distribution less than a predetermined probability threshold from the second topic model.

In a second aspect, an embodiment of the present disclosure provides an apparatus for compressing a topic model. The apparatus comprises: an acquisition unit configured to acquire a to-be-compressed topic model, wherein each line of the topic model represents a distribution of a word among respective topics; a first conversion unit configured to perform a format conversion on the topic model to obtain a first topic model, wherein each line of the first topic model represents a distribution of a topic among respective words, and the respective words on the topic are sorted in a descending order according to a number of the words on the topic; a similarity determining unit configured to select any two topics from the first topic model to form a topic pair, forming a topic pair set using at least one topic pair, and determining a similarity between the two topics in each topic pair in the topic pair set; a merging unit configured to merge topic pairs having a similarity greater than a similarity threshold to generate a second topic model; and a second conversion unit configured to perform a format conversion on the second topic model to obtain a compressed topic model, wherein each line of the compressed topic model represents a distribution of a word among the respective topics.

In some embodiments, the similarity determining unit is further configured to determine a Jaccard similarity between words on two topics of each topic pair in the topic pair set.

In some embodiments, the similarity determining unit is further configured to determine a similarity according to a repetition probability of words on two topics of each topic pair in the topic pair set.

In some embodiments, the merging unit is further configured to determine a disjoint topic set using the union-find algorithm and to merge topics in the disjoint topic set to generate a second topic model.

In some embodiments, the apparatus further comprises a deletion unit configured to: before performing a format conversion on the second topic model to obtain a compressed topic model, for each topic in the second topic model, to determine a probability distribution of each word among the topics; and to delete a word having a probability distribution less than a predetermined probability threshold from the second topic model.

In a third aspect, an embodiment of the present disclosure provides an apparatus, comprising: one or more processors; and a storage device for storing one or more programs, when the one or more programs are executed by the one or more processors, the one or more processors implement any the method as described in the first aspect.

In a fourth aspect, an embodiment of the present disclosure provides a computer readable storage medium stored with a computer program thereon, wherein the program implements any the method as described in the first aspect when being executed by the processor.

According to the method and apparatus for compressing a topic model provided in the embodiments of the present disclosure, after a topic model is subjected to format conversion, the topics having a similarity greater than a similarity threshold are merged according to the similarity between respective topics, and then the merged topic model is converted to be in an initial format to generate a compressed topic model, thereby facilitating to storage of the topic model and improving the calculating efficiency for the subsequent document application using the topic model.

BRIEF DESCRIPTION OF THE DRAWINGS

Other features, objects and advantages of the present disclosure will be more apparent by reading the detailed description of the non-limiting embodiments taken in conjunction with the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
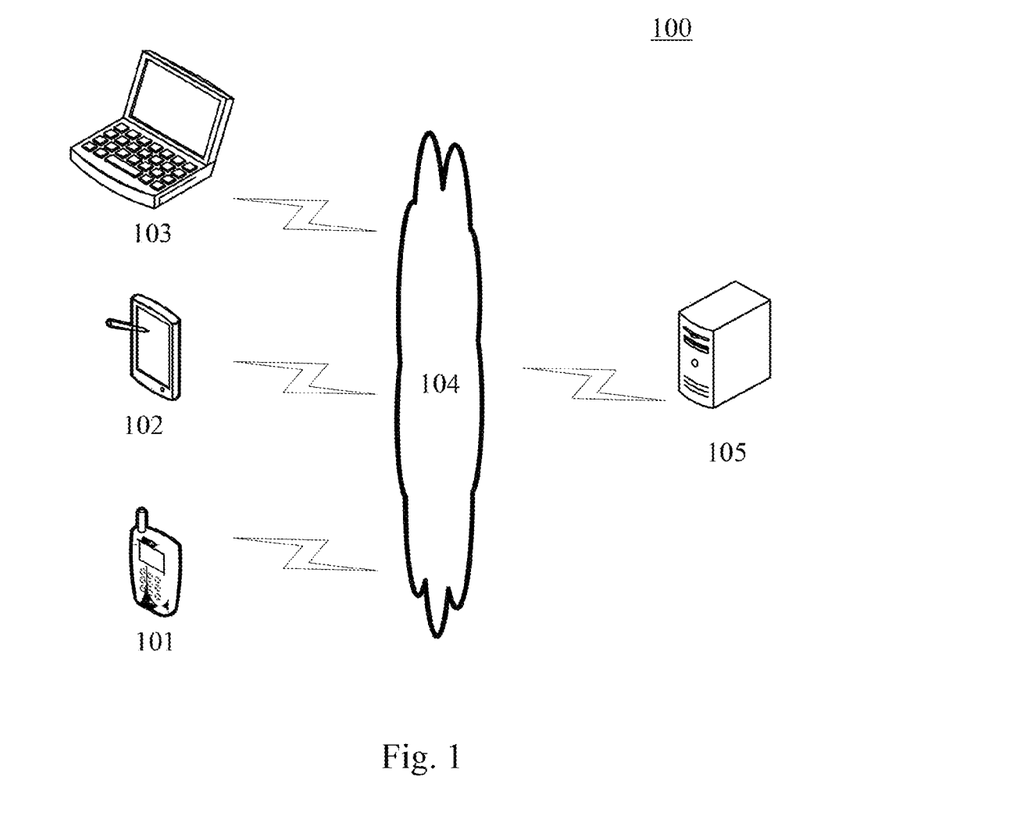
FIG. 1 is an exemplary system architecture diagram to which the present disclosure may be applied.

FIG. 1 shows an exemplary architecture of a system 100 which may be used by a method for compressing a topic model or an apparatus for compressing a topic model according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various communication client applications, such as web browser applications, shopping applications, search applications, instant messaging tools, mailbox clients, and social platform software may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a backend recommendation server providing support to the displayed webpages on the terminal devices 101, 102 or 103. The backend server may process received sample data to generate a topic model, and receive keyword query request from the terminal devices, return a processing result (for example, texts favoured by the user related to the keywords) to the terminal devices.

It should be noted that the method for compressing the topic model according to the embodiments of the present disclosure is generally executed by the server 105. Accordingly, an apparatus for compressing the topic model is generally installed on the server 105.

It should be understood that, the numbers of terminal devices, networks, and servers in FIG. 1 are merely illustrative. Depending on implementation needs, any numbers of terminal devices, networks, and servers may be provided. It is possible not to require a terminal device be used, and to use a server directly to perform compression processing according to the pre-stored topic model.

Figure 2:
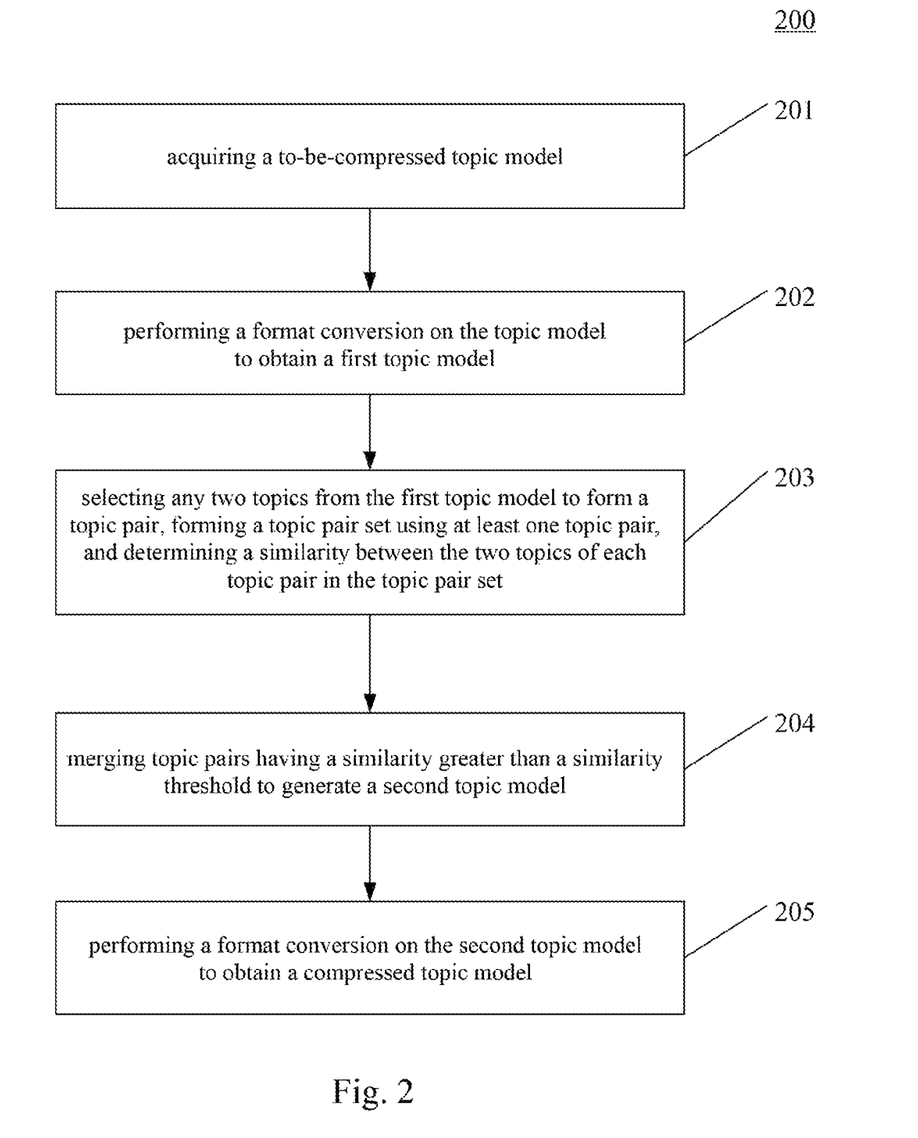
FIG. 2 is a flowchart of one embodiment of a method for compressing a topic model according to the present disclosure.

Continue to refer to FIG. 2, which shows a flow 200 of an embodiment of a method for compressing a topic model according to the present disclosure. The method for compressing a topic model comprises the following steps:

Step 201, acquiring a to-be-compressed topic model.

In the present embodiment, electronic equipment (for example, a server shown in FIG. 1) on which a method for compressing a topic model runs may acquire an ready-trained and to-be-compressed topic model through a third-party server, and may also receive sample data sent by a terminal to train a topic model. Each line of the topic model represents a distribution of a word among respective topics.

Figure 3A:
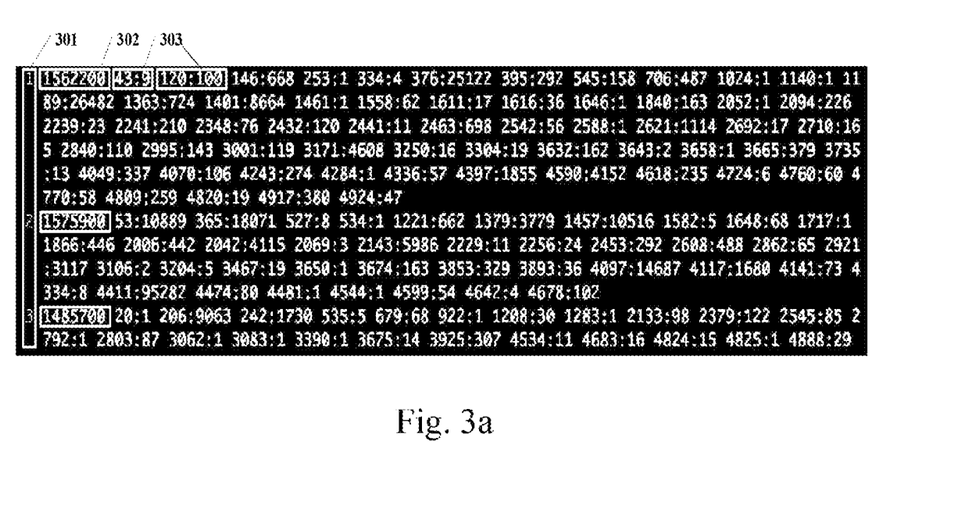
FIG. 3a is an example of a to-be-compressed topic model of a method for compressing a topic model according to the present disclosure.

As an example, the format of a well-trained topic model may be {word_id topic_id:count topic_id:count . . . }, each line represents a distribution of a word among respective topics; word_id represents a serial number of a word; topic_id represents a serial number of a topic; and count represents a number of the word under the corresponding topic. An example of the topic model is shown in FIG. 3a. Numbers (1, 2, 3) in box 301 are line numbers, only for facilitating the presentation. Word_id (i.e. a serial number of a word) is in box 302; and topic_id: count (i.e. a serial number of the topic: the number of the word under the corresponding topic) is in box 303. Optionally, a distribution of a word among respective topics may also be a probability of a word appearing on respective topics.

Step 202, performing a format conversion on the topic model to obtain a first topic model.

In the present embodiment, each line of the first topic model represents a distribution of a topic among respective words, and the respective words on the topic are sorted in a descending order according to a number of the words on the topic. i.e., the topic model in an initial word-topic format is converted to a topic-word format. The specific topic-word format is {(word_id, topic_count), (word_id, topic_count), . . . }, i.e., each line represents a distribution of a topic among respective words, word_id represents a serial number of a word, topic_count represents a number of the corresponding words under the topic, sorted in a descending order according to topic_count.

Step 203, selecting any two topics from the first topic model to form a topic pair, forming a topic pair set using at least one topic pair, and determining a similarity between the two topics of each topic pair in the topic pair set.

In the present embodiment, the topic model is subjected to unsupervised training. In the event that the number of the topics is set too large or too small, serious redundancy will occur between multiple topics. For any two topics, a distribution of the first K words (i.e., taking K words which are sorted according to the numbers of the words in the topic in a descending order, K being a preset natural number, for example, being 30) needs to be considered. A similarity between the two topics in each topic pair in the topic pair set may be determined by a Jaccard Similarity or a Weighted Jaccard Similarity.

In some optional implementation modes of the present embodiment, determining a similarity between words in the two topics of the each topic pair in the topic pair set comprises: determining the Jaccard Similarity between words in the two topics in each topic pair in topic pair set. For any two topics, calculating the Jaccard Similarity of the first K words, defined as:

$$J(A,B)=(|A \cap B|)/(|A \cup B|)=(|A \cap B|)/(|A|+|B|-|A \cap B|) \quad \text{(Formula 1)}$$

The topic model that is calculated is in a topic-word format {(word_id, topic_count), (word_id, topic_count), . . . }, where J (A,B) is a similarity between two topics; $A=(a_1, a_2, \ldots, a_K)$ and $B=(b_1, b_2, \ldots, b_K)$ respectively is vectors formed of the first K word_ids extracted from the two topics; the physical meaning of $|A \cap B|$ on the numerator is a number of words repeated in the first K words of the two topics; and the physical meaning of $|A \cup B|$ on the denominator is a number of words covered in the first K words of the two topics in total.

In some optional implementation modes of the present embodiment, determining a similarity between the two topics in each topic pair in the topic pair set comprises: determining a similarity according to a repetition probability of words in the two topics in each topic pair in topic pair set. For any two topics, calculating the Weighted Jaccard Similarity of the first K words, is defined as:

$$J(X,Y) = \frac{\sum_{1}^{m} \min(x_i, y_i)}{\sum_{1}^{m} \max(x_i, y_i) + \sum_{m+1}^{K} x_i + \sum_{m+1}^{K} y_i} = \quad \text{(Formula 2)}$$

$$\frac{\sum_{1}^{m} \min(x_i, y_i)}{\sum_{1}^{K} x_i + \sum_{1}^{K} y_i - \sum_{1}^{m} \min(x_i, y_i)}$$

The topic model being calculated is in a topic-word format {(word_id, topic_count), (word_id, topic_count), . . . }. In order to further obtain a probability distribution of each word, the topic_count of a word under each topic is counted to obtain a topic_sum of the word under the topic. The probability form of the topic model that is calculated is {(word_id, topic_count/topic_sum), (word_id, topic_count/topic_sum), . . . }. In the Weighted Jaccard Similarity calculation, J (X,Y) is a similarity between two topics, $X=(x_1, x_2, \ldots, x_m, x_{m+1}, \ldots, x_K)$ and $Y=(y_1, y_2, \ldots, y_m, y_{m+1}, \ldots, y_K)$ respectively are vectors formed by probabilities topic_count/topic_sum corresponding to the first K words extracted from the two topics, where $0 \leq m \leq K$ represents the number of words repeated in the first K words of the two topics, i.e., word id corresponds to $x_i$ and $y_i$ within a range of $1 \leq i \leq m$ is the same. $\Sigma_1^m \min(x_i, y_i)$ on the numerator sums up small probabilities of repeated words in the two topics. $\Sigma_1^m \max(x_i, y_i) + \Sigma_{m+1}^K x_i + \Sigma_{m+1}^K y_i$ on the denominator sums up large probabilities of words repeated in the two topics and probabilities of non-reapetitive words therein.

Step 204, merging topic pairs having a similarity greater than a similarity threshold to generate a second topic model.

In the present embodiment, any two topics $t_i$ and $t_j$ ($1 \leq i, j \leq N$, N being a number of topics in total) in the topic model are subjected to similarity estimation. If the similarity of the two topics is greater than or equal to a user-defined similarity threshold, it indicates that a large redundancy exists between the two topics; and redundant topic pairs $(t_i, t_j)$ are recorded. All redundant topic pairs $(t_i, t_j)$ are recorded and are subjected to a redundant topic merge, and all blank lines are removed to obtain a de-weighted second topic model in a topic-word format.

In some optional implementation modes of the present embodiment, merging topic pairs having a similarity greater than a similarity threshold to generate a second topic model comprises: determining a disjoint topic set using a union-find algorithm; and merging topics in the disjoint topic set to generate a second topic model. Union-find is a tree-type data structure for handling merging and query of disjoint sets and is often expressed as a forest in use. A set is to allow each element to compose a single element set, that is, sets having elements belonging to the same group are merged in a certain order.

The input of a union-find algorithm is the redundant topic pairs. In order to better explain the Union Find algorithm, we use a simple example to illustrate. Assuming that the current input is {(1,2), (2,3), (4,5), (6,7), (1,7)}, where (1,2) represents that a large redundancy exists between a topic 1 and a topic 2, (2, 3) representing that a large redundancy exists between the topic 2 and a topic 3, and so on. According to the union-find algorithm, first, an indices map needs to be calculated, i.e., indices of each topic in the input topic pairs are needed to be listed. The obtained indices map is {1:[0,4], 2:[0,1], 3:[1], 4:[2], 5:[2], 6:[3], 7:[3,4]}, where 1:[0,4] represents that the topic 1 is mapped into the $0^{th}$ and $4^{th}$ indices of the input redundant topic pairs. Disjoint indices of the indexed disjoint set then need to be calculated. Each set represents that topic pairs indexed therein are redundant. The obtained disjoint indices of disjoint redundant topic pairs is {set(0, 1, 3, 4), set(2)}, where set(0, 1, 3, 4) represents a joint redundancy of topic pairs on the $0^{th}$, first, third and $4^{th}$ indices in the redundant topic pairs. Finally, on the basis of the disjoint indices, a topic set can be obtained from the indices. The obtained disjoint set is {set(1, 2, 3, 6, 7), set(4,5)}, where set(1, 2, 3, 6, 7) represents a joint redundancy of the topics 1, 2, 3, 6 and 7.

According to the disjoint topic set obtained by the union-find algorithm, on the basis of the topic model in a topic-word format, for each set, a first topic in the set is selected as a root topic, and the remaining topics in the set are merged into the root topic and are deleted from the model having the topic-word format. Continuing to use the above simple example for illustration, the disjoint set obtained by the Union-find algorithm is {set(1, 2, 3, 6, 7), set(4,5)}, where set (1, 2, 3, 6, 7) represents that a joint redundancy exists between topics 1, 2, 3, 6, and 7, the topic 1 is selected as a root topic, the topics 2, 3, 6, and 7 are merged into the topic 1, and contents in the lines where the topics 2, 3, 6 and 7 exist are deleted on the model in the topic-word format; set(4, 5) represents that a joint redundancy exists between topics 4 and 5, the topic 4 is selected as a root topic, the topic 5 is merged into the topic 4, and the contents in the lines where the topic 5 exists are deleted from the model having the topic-word format. After all disjoint sets are merged, all blank lines are removed to obtain a weighted topic model in the topic-word format.

Step 205, performing a format conversion on the second topic model to obtain a compressed topic model, wherein each line of the compressed topic model represents a distribution of a word among the respective topics.

In the present embodiment, the merged topic model has a topic-word format. It is noteworthy that, in a topic merging process, redundant topics are merged, thereby a total number of the topics is lessened and the serial numbers of a part of the topics are also changed. Since the serial numbers of the topic have no specific physical meaning and are only for distinguishing the topics, the change of the serial numbers is acceptable. Considering that the initially input topic model has a word-topic format, in order to be consistent with the input, the merged topic model is subjected to a format conversion to have a word-topic format and then output.

Figure 3B:
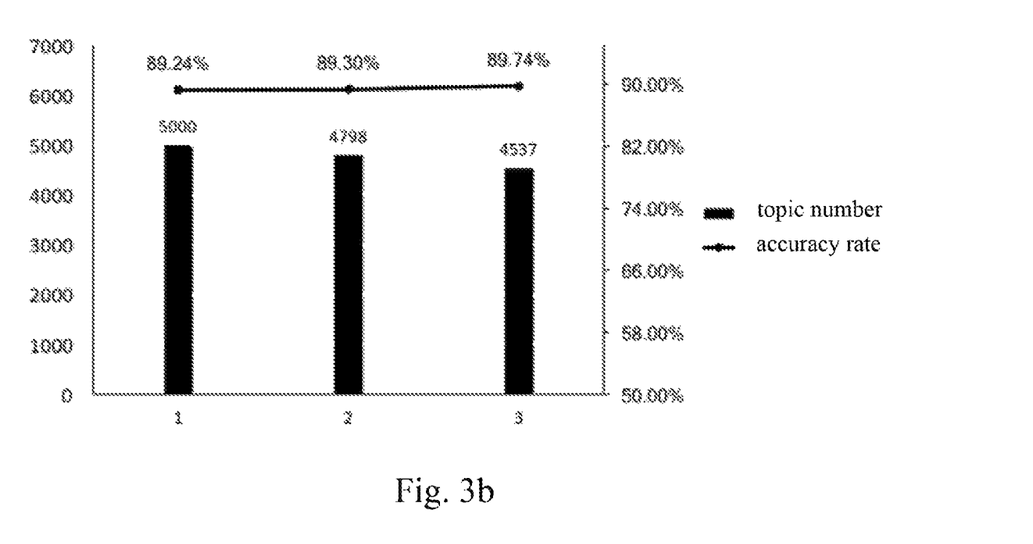
FIG. 3b is a diagram showing an application effect of one embodiment of a method for compressing a topic model according to the present disclosure.

Continue to refer to FIG. 3b, FIG. 3b is a diagram showing an application effect of one embodiment of a method for compressing a topic model according to the present disclosure. A news tag inferred database is preconstructed on the basis of news data in 2016 to validate the topic model compression technology proposed in the present disclosure. An input model is a topic model trained from a massive network corpus and includes 5000 topics in total. Jaccard Similarity and Weighted Jaccard Similarity strategies are respectively used to estimate the redundancy between the topics. K and the similarity threshold are set as 30 and 0.4, respectively. Two merged compressed topic models are obtained and experimental results are shown in FIG. 3b. The initial topic model includes 5000 topics, and the accuracy rate of the news tag inference is 89.24%. The topic model merged and compressed using the Jaccard Similarity strategy includes 4798 models, and the accuracy rate of the news tag inference is 89.30%. the topic model merged and compressed using the Weighted Jaccard Similarity method includes 4537 topics, and the accuracy rate of the news tag inference is 89.74%, increased by 0.50% compared with the accuracy rate of the initial model. These experimental results indicate that the use of the topic model merging compression technology could not only reduce the redundancy between the topics, but also could further enhance the performance of the topic model in some tasks.

According to the method provided by the above embodiments of the present disclosure, topics having a similarity greater than a similarity threshold in the topic model are merged to obtain a compressed topic model, thereby reducing the storage space and improving the inference accuracy rate in subsequent applications.

Figure 4:
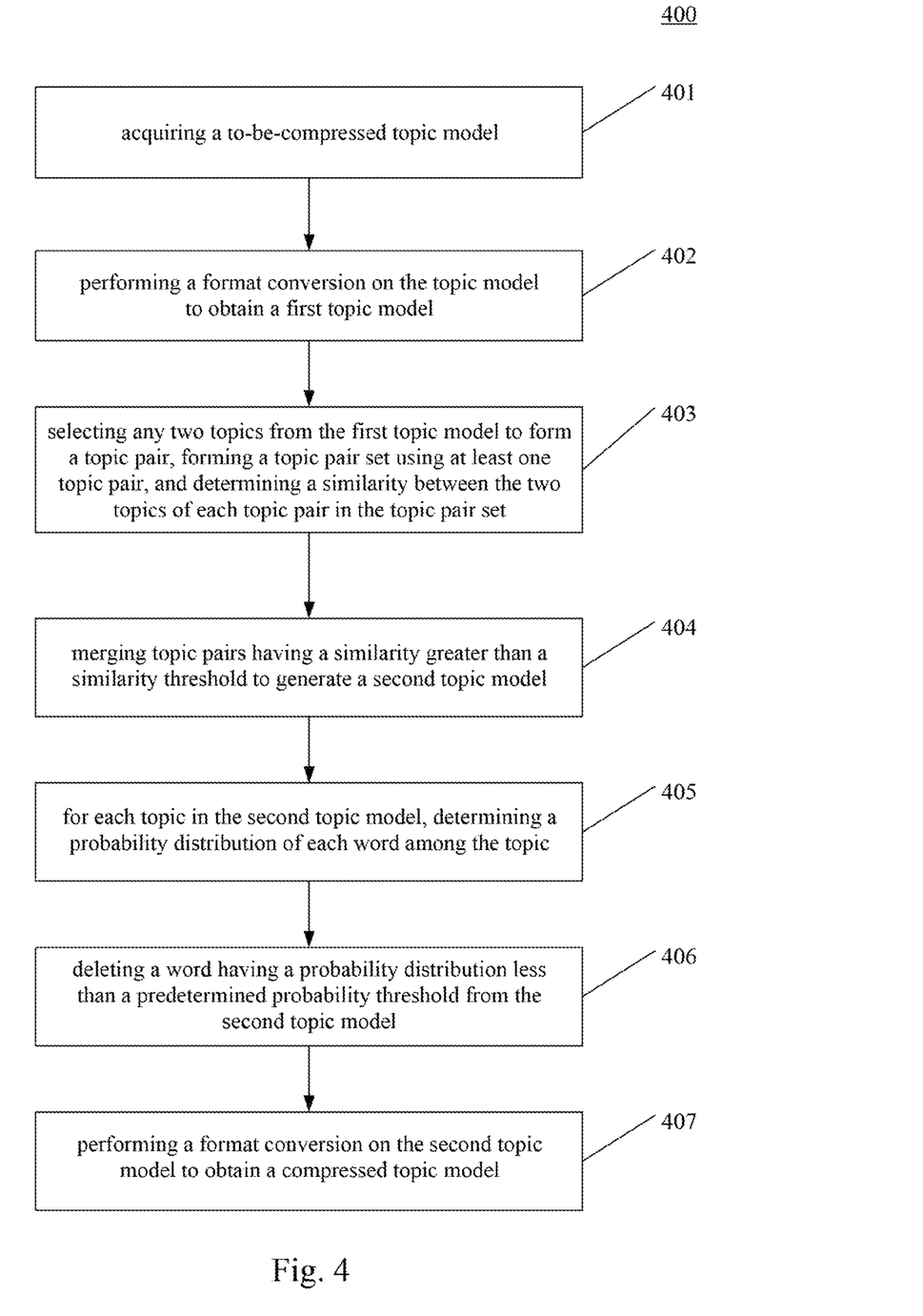
FIG. 4 is a flowchart of another embodiment of a method for compressing a topic model according to the present disclosure.

With further reference to FIG. 4, which shows a flow 400 of another embodiment of a method for compressing a topic model. The flow 400 of the method for compressing the topic model includes the following steps:

Step 401, acquiring a to-be-compressed topic model.

Step 402, performing a format conversion on the topic model to obtain a first topic model.

Step 403, selecting any two topics from the first topic model to form a topic pair, forming a topic pair set using at least one topic pair, and determining a similarity between the two topics in each topic pair in the topic pair set.

Step 404, merging topic pairs having a similarity greater than a similarity threshold to generate a second topic model.

Steps 401-404 are basically the same as steps 201-204 and therefore will not be repeated here.

Step 405, for each topic in the second topic model, determining a probability distribution of each word among the topic.

In the present embodiment, the similarity threshold in step 404 may be 100%, i.e., the initially trained topic model without merging compression is directly compressed at step 406; or the topic model is further compressed at step 406 after merging compression. In step 402, the initial model in a word-topic format is converted to have a topic-word format. As an example, a specific topic-word format may be {(word_id, topic_count), (word_id, topic_count), . . . }, wherein word_id represents a serial number of a word; topic_count represents a number of the corresponding word under the topic, sorted in a descending order according to topic_count; that is, each line represents a distribution of a topic on the word. The topic model is in the topic-word format {(word_id, topic_count), (word_id, topic_count), . . . }. Considering that the numbers of words contained in respective topics and the counts of each word are all different, the topic_count of a word under each topic is counted to obtain topic_sum of the word under the topic, and to further obtain a probability distribution {(word_id, topic_count/topic_sum), (word_id, topic_count/topic_sum), . . . } of each word among the topics.

Step 406, deleting a word having a probability distribution less than a predetermined probability threshold from the second topic model.

In the present embodiment, since the distribution of each topic in an initial topic-word format is sorted in a descending order according to topic_count, the probability distribution of the topic is also sorted in a descending order according to topic_count/topic_sum. Since in principle each topic has a distribution in the entire vocabulary, in the case of massive training data, the topic contains a number of low-frequency words, and these low-frequency words have minor influence on the expression of the entire topic. For purposes of storage and calculating efficiency, these low-frequency word entries having minor influence need to be deleted from the model, and compress the model. For each topic, the probability of each word is considered from the end, if the probability is less than the predetermined probability threshold, the (word_id, topic_count) entries are deleted, and next, the model is compressed in an order from the back (low frequency) to the front (high frequency).

Step 407, performing a format conversion on the second topic model to obtain a compressed topic model, wherein each line of the compressed topic model represents a distribution of a word among the respective topics.

Step 407 is basically the same as step 205 and therefore will not be repeated here.

In order to validate the compression technology of the topic model, the initial topic model (including 5000 topics) and the de-weighted topic model (including 4537 topics, using the default Weighted Jaccard Similarity method) are also tested on a news tag inferred dataset. The probability threshold is set to 0 (i.e., no compression), 1e-7,1e-6,1e-5, 1e-4,1e-3,1e-2,1e-1. The experimental results are shown in FIGS. 5a and 5b.

Figure 5A:
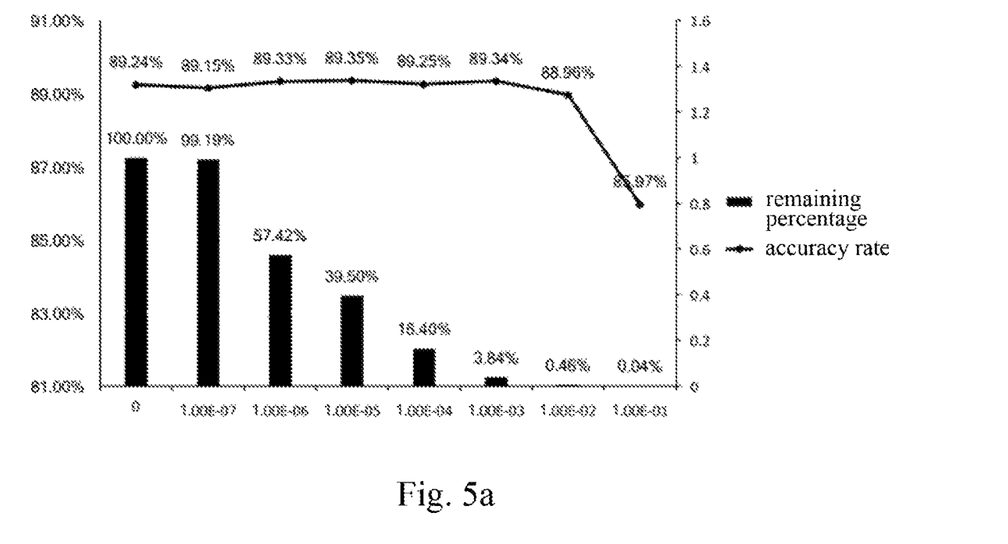
FIGS. 5a and 5b are diagrams showing an application effect of another embodiment of a method for compressing a topic model according to the present disclosure.
Figure 5B:
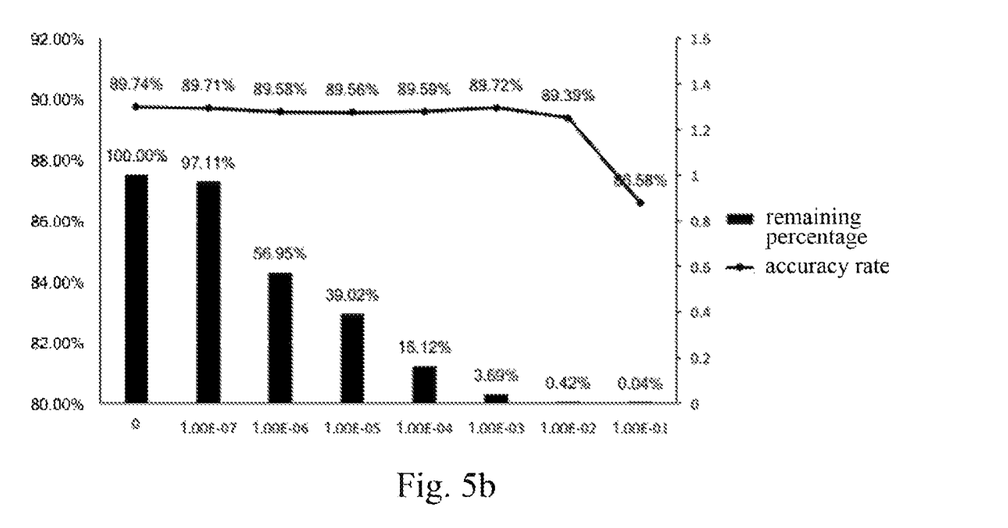

FIGS. 5a and 5b show, ratios (histograms) of remaining total entries in the compressed topic model to total entries in the initial model, and corresponding accuracy rates (curves) of the news tag inference with change of the probability threshold. Experimental results show that, under a condition of only 4% of the remaining entries, the compressed topic model can still achieve a similar accuracy rate of the news tag inference to the initial model.

It can be seen from FIG. 4 that, compared with the embodiment corresponding to FIG. 2, the flow 400 of the method for compressing the topic model in the present embodiment highlights the step of deleting low-frequency words. Therefore, the solution described in the present embodiment could not only improve the storage efficiency of the topic model, but also further improve the subsequent calculation efficiency of the topic model on the premise of guaranteeing the performance of the topic model.

Figure 6:
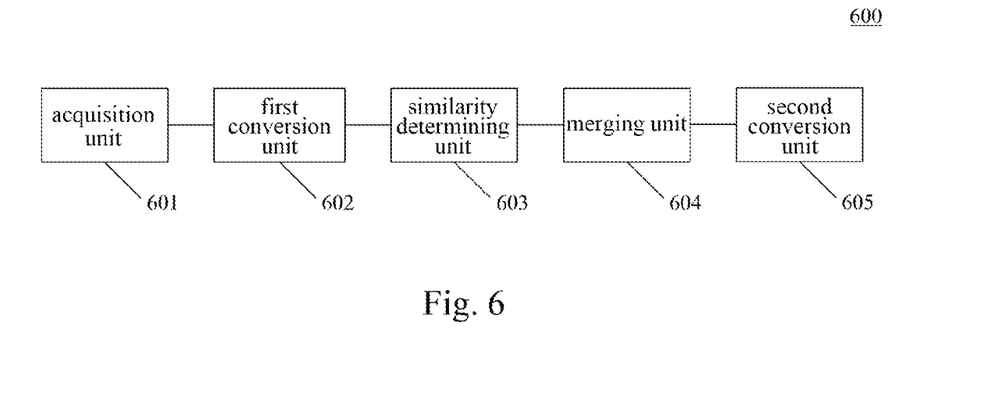
FIG. 6 is a structural schematic diagram of one embodiment of an apparatus for compressing a topic model according to the present disclosure.

With further reference to FIG. 6, as an implementation of the method shown in the above respective figures, the present disclosure provides an embodiment of an apparatus for compressing a topic model. The apparatus embodiment corresponds to the method embodiment shown in FIG. 2. The apparatus can be particularly applied to various electronic devices.

As shown in FIG. 6, an apparatus 600 for compressing the topic model according to the present embodiment comprises: an acquisition unit 601, a first conversion unit 602, a similarity determining unit 603, a merging unit 604 and a second conversion unit 605, wherein the acquisition unit 601 is configured to acquire a to-be-compressed topic model, wherein each line of the topic model represents a distribution of a word among respective topics; the first conversion unit 602 is configured to perform a format conversion on the topic model to obtain a first topic model, wherein each line of the first topic model represents a distribution of a topic among respective words, and the respective words on the topic are sorted in a descending order according to a number of the words on the topic; a similarity determining unit 603 is configured to select any two topics from the first topic model to form a topic pair, to form a topic pair set using at least one topic pair, and to determine a similarity between the two topics in each topic pair in the topic pair set; a merging unit 604 is configured to merge topic pairs having a similarity greater than a similarity threshold to generate a second topic model; and a second conversion unit 605 is configured to perform a format conversion on the second topic model to obtain a compressed topic model, wherein each line of the compressed topic model represents a distribution of a word among the respective topics.

In the present embodiment, for specific configurations of the acquisition unit 601, the first conversion unit 602, the similarity determining unit 603, the merging unit 604 and the second conversion unit 605 of the apparatus 600 for compressing the topic model, step 201, step 202, step 203, step 204, and step 205 in the embodiment corresponding FIG. 2 may be referred.

In some optional implementation modes of the present embodiment, the similarity determining unit 603 is further configured to determine a Jaccard similarity between words on the two topics in each topic pair in the topic pair set.

In some optional implementation modes of the present embodiment, the similarity determining unit is further configured to determine a similarity according to a repetition probability of words on the two topics in each topic pair in the topic pair set.

In some optional implementation modes of the present embodiment, the merging unit 604 is further configured to determine a disjoint topic set using a union-find algorithm; and to merge topics in the disjoint topic set to generate a second topic model.

In some optional implementation modes of the present embodiment, the apparatus 600 further comprises a deletion unit configured to: before performing a format conversion on the second topic model to obtain a compressed topic model, for each topic in the second topic model, to determine a probability distribution of each word among the topics; and to delete a word having the probability distribution less than a predetermined probability threshold from the second topic model.

Figure 7:
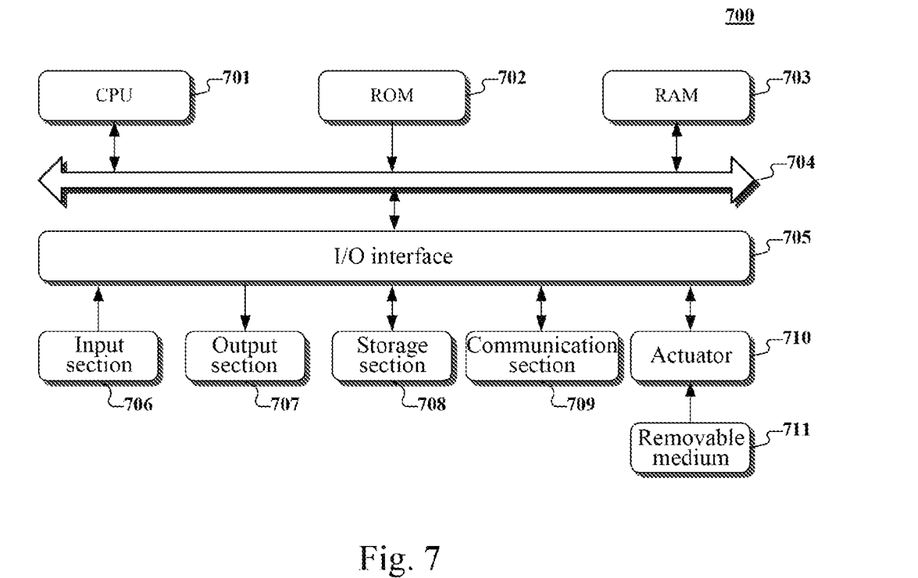
FIG. 7 is a structural schematic diagram of a computer system adapted to implement an embodiment of a server in the present disclosure.

In the present embodiment, referring to FIG. 7, which shows a structural schematic diagram of a computer system 700 of a server adapted to implement embodiments of the present disclosure. The server shown in FIG. 7 is merely an example, and should not impose any limitation on the function and the scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 709, and/or may be installed from the removable media 711. The computer program, when executed by the central processing unit (CPU) 701, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising an acquisition unit, a first conversion unit, a similarity determining unit, a merging unit and a second conversion unit, where the names of these units or modules do not in some cases constitute a limitation to such units or modules themselves. For example, the blocking unit may also be described as "a unit for acquiring a to-be-compressed topic model."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by an apparatus, cause the device to: acquire a to-be-compressed topic model, wherein each line of the topic model represents a distribution of a word among respective topics; perform a format conversion on the topic model to obtain a first topic model, wherein each line of the first topic model represents a distribution of a topic among respective words, and the respective words on the topic are sorted in a descending order according to a number of the words on the topic; select any two topics from the first topic model to form a topic pair, form a topic pair set using at least one topic pair, and determine a similarity between the two topics in each topic pair in the topic pair set; merge topic pairs having a similarity greater than a similarity threshold to generate a second topic model; and perform a format conversion on the second topic model to obtain a compressed topic model, wherein each line of the compressed topic model represents a distribution of a word among the respective topics.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for compressing a topic model, the method comprising:
acquiring a to-be-compressed topic model, wherein each line of the topic model represents a distribution of a word among respective topics;
performing a format conversion on the topic model to obtain a first topic model, wherein each line of the first topic model represents a distribution of a topic among respective words, and the respective words on the topic are sorted in a descending order according to a number of the words on the topic;
selecting any two topics from the first topic model to form a topic pair, forming a topic pair set using at least one topic pair, and determining a similarity between the two topics in each topic pair in the topic pair set;

merging topic pairs having a similarity greater than a similarity threshold to generate a second topic model; and performing a format conversion on the second topic model to obtain a compressed topic model, wherein each line of the compressed topic model represents a distribution of a word among the respective topics.

2. The method according to claim 1, wherein the determining a similarity between the two topics in each topic pair in the topic pair set comprises:

determining a Jaccard similarity between words in the two topics of the each topic pair in the topic pair set.

3. The method according to claim 1, wherein the determining a similarity between the two topics in each topic pair in the topic pair set comprises:

determining the similarity according to a repetition probability of words in the two topics of the each topic pair in the topic pair set.

4. The method according to claim 1, wherein the merging topic pairs having a similarity greater than a similarity threshold to generate a second topic model comprises:

determining a disjoint topic set using union-find algorithm; and merging topics in the disjoint topic set to generate a second topic model.

5. The method according to claim 1, wherein before the performing a format conversion on the second topic model to obtain a compressed topic model, the method further comprises:

for each topic in the second topic model, determining a probability distribution of each word among the topics; and deleting a word having a probability distribution less than a predetermined probability threshold from the second topic model.

6. An apparatus for compressing a topic model, the apparatus comprising:

at least one processor; and a memory storing instructions, the instructions when executed by the at least one processor, cause the at least one processor to perform operations, the operations comprising:

acquiring a to-be-compressed topic model, wherein each line of the topic model represents a distribution of a word among respective topics;

performing a format conversion on the topic model to obtain a first topic model, wherein each line of the first topic model represents a distribution of a topic among respective words, and the respective words on the topic are sorted in a descending order according to a number of the words on the topic;

selecting any two topics from the first topic model to form a topic pair, form a topic pair set using at least one topic pair, and determine a similarity between the two topics in each topic pair in the topic pair set;

merging topic pairs having a similarity greater than a similarity threshold to generate a second topic model; and performing a format conversion on the second topic model to obtain a compressed topic model, wherein each line of the compressed topic model represents a distribution of a word among the respective topics.

7. The apparatus according to claim 6, wherein the determining a similarity between the two topics in each topic pair in the topic pair set comprises: determining a Jaccard similarity between words on two topics in each topic pair in the topic pair set.

8. The apparatus according to claim 6, wherein the determining a similarity between the two topics in each topic pair in the topic pair set comprises: determining the similarity according to repetition probability of words on two topics in each topic pair in the topic pair set.

9. The apparatus according to claim 6, wherein the merging topic pairs having a similarity greater than a similarity threshold to generate a second topic model comprises:

determining a disjoint topic set using union-find algorithm; and merging topics in the disjoint topic set to generate a second topic model.

10. The apparatus according to claim 6, the operations further comprising:

for each topic in the second topic model, determining a probability distribution of each word among the topics; and deleting a word having a probability distribution less than a predetermined probability threshold from the second topic model before performing a format conversion on the second topic model to obtain a compressed topic model.

11. A non-transitory computer readable storage medium storing a computer program, the computer program when executed by one or more processors, causes the one or more processors to perform operations, the operations comprising:

acquiring a to-be-compressed topic model, wherein each line of the topic model represents a distribution of a word among respective topics;

performing a format conversion on the topic model to obtain a first topic model, wherein each line of the first topic model represents a distribution of a topic among respective words, and the respective words on the topic are sorted in a descending order according to a number of the words on the topic;

selecting any two topics from the first topic model to form a topic pair, forming a topic pair set using at least one topic pair, and determining a similarity between the two topics in each topic pair in the topic pair set;

merging topic pairs having a similarity greater than a similarity threshold to generate a second topic model; and performing a format conversion on the second topic model to obtain a compressed topic model, wherein each line of the compressed topic model represents a distribution of a word among the respective topics.

* * * * *